(12) United States Patent
Mritunjai et al.

(10) Patent No.: US 10,740,312 B1
(45) Date of Patent: Aug. 11, 2020

(54) ASYNCHRONOUS INDEXING OF DATABASE TABLES

(71) Applicant: Amazon Technologies, Inc., Seattle, WA (US)

(72) Inventors: Akhilesh Mritunjai, Seattle, WA (US); Wei Xiao, Bellevue, WA (US)

(73) Assignee: Amazon Technologies, Inc., Seattle, WA (US)

(*) Notice: Subject to any disclaimer, the term of this patent is extended or adjusted under 35 U.S.C. 154(b) by 590 days.

(21) Appl. No.: 15/387,527

(22) Filed: Dec. 21, 2016

(51) Int. Cl.
*G06F 16/22* (2019.01)
*G06F 16/27* (2019.01)

(52) U.S. Cl.
CPC ...... *G06F 16/2272* (2019.01); *G06F 16/2282* (2019.01); *G06F 16/273* (2019.01)

(58) Field of Classification Search
CPC .............. G06F 16/235; G06F 16/282; G06F 16/24578; G06F 16/2272; G06F 16/273; G06F 16/2282
USPC .................................................. 707/625, 613
See application file for complete search history.

(56) References Cited

U.S. PATENT DOCUMENTS

| 7,257,689 | B1 * | 8/2007 | Baird | G06F 11/1471 |
| | | | | 711/162 |
| 2006/0294058 | A1 * | 12/2006 | Zabback | G06F 16/2462 |
| 2007/0143371 | A1 * | 6/2007 | Kottomtharayil | G06F 3/0619 |
| 2009/0210429 | A1 * | 8/2009 | Agrawal | G06F 16/273 |
| 2018/0150363 | A1 * | 5/2018 | Kim | G06F 11/1469 |

OTHER PUBLICATIONS

Amazon DynamoDB, Developer Guide (API Version Aug. 10, 2012), sections: "Local Secondary Indexes", retrieved at https://docs.aws.amazon.com/amazondynamodb/latest/developerguide/LSI.html (Year: 2012).*
Amazon DynamoDB, Developer Guide (API Version Aug. 10, 2012), sections: "Global Secondary Indexes", retrieved at https://docs.aws.amazon.com/amazondynamodb/latest/developerguide/GSI.html (Year: 2012).*
Amazon DynamoDB, Developer Guide (API Version Aug. 10, 2012), sections: "Local Secondary Indexes", retrieved at hhttps://docs.aws.amazon.com/amazondynamodb/latest/developerguide/LSI.html (Year: 2012).*

* cited by examiner

*Primary Examiner* — Evan Aspinwall
(74) *Attorney, Agent, or Firm* — Davis Wright Tremaine LLP

(57) ABSTRACT

Techniques for asynchronously indexing database tables are described herein. An update to data in a database table causes an update to an index table of the database. The update to the index table is made first to the index table and then to a replica of the index table. A first copy of the update is stored in a first replica of the index table and then a second copy of the update is provided to an asynchronous process that stores the second copy of the update in a second replica of the index table.

20 Claims, 10 Drawing Sheets

ASYNCHRONOUS INDEXING OF DATABASE TABLES

BACKGROUND

Modern computer systems make extensive use of database services to store, access, and organize data. Such use has proliferated in recent years, particularly in distributed or virtualized computer systems where multiple computer systems may share resources when performing operations and tasks associated with the computer systems and store data associated with those operations and tasks. Such computer systems frequently utilize distributed data storage in multiple locations to store shared data items so that such data items may be made available to a plurality of consumers. The resources for network computing and network data storage are often provided by computing resource providers who leverage large-scale networks of computers, servers, and storage drives to enable customers to host and execute a variety of applications and services and store and retrieve data associated with those applications and services. The usage of such network computing and network data storage allows users to efficiently and adaptively satisfy their varying computing needs, whereby the computing and data storage resources that may be used by the customers are added or removed from a large pool provided by a computing resource provider as needed.

The proliferation of network computing and network data storage, as well as the attendant increase in the number of entities dependent on network computing and network data storage, have increased the amount of data to be stored and the needs of consumers for searching such stored data and retrieving such stored data. Performing such searches and retrievals can cause significant demand for resources needed to search for the data where it is stored and to retrieve the data when it is needed.

BRIEF DESCRIPTION OF THE DRAWINGS

Various techniques will be described with reference to the drawings, in which.

DETAILED DESCRIPTION

Figure 1:
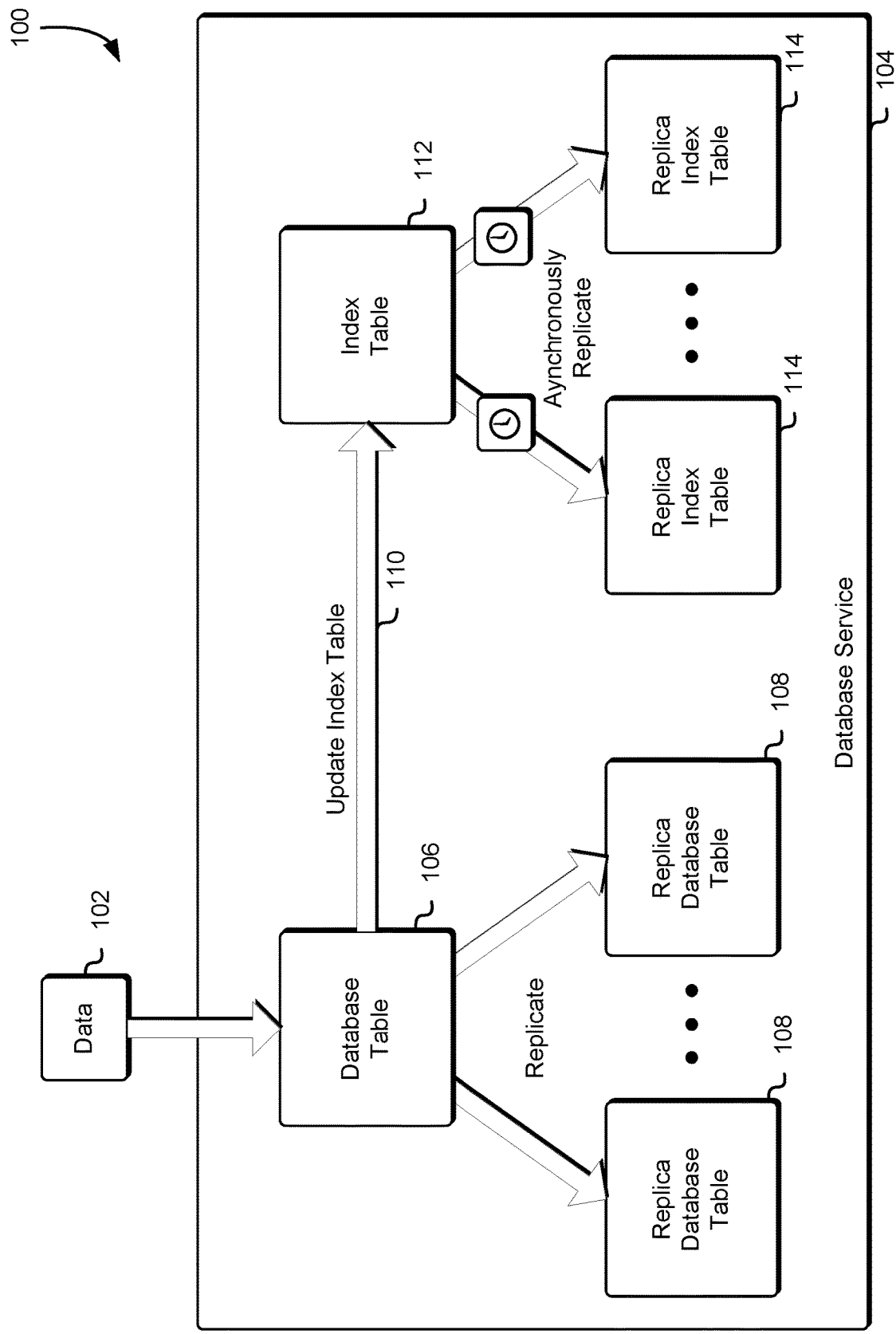
FIG. 1 illustrates an example environment where a database service updates and asynchronously indexes database tables.

When a customer of a computing resource service provider generates data for storage within the computing resource service provider environment, that data may be stored in a database. When data that adds, alters, or updates entries in a database table is received at, for example, a database service, the database service stores the data in the database table for later searching and retrieval. Data that adds, alters, or updates entries in a database table may take many forms. For example, a first update may add a new user to a table of users with a "USERID" of "001." A second update may add a PASSWORD to that USERID, and a later update may alter that PASSWORD. As each change is received by the database service, the database service may update one or more replicas of the database table. Replicas of database tables may be maintained by a database service to improve the durability of the database table. By replicating a database table (i.e., by making multiple copies of a database table), a database service can ensure that, if one or more copies of the database table are lost, destroyed, deleted, or corrupted, the data can be recovered from one or more of the replicas. Replicas of database tables may also be maintained by a database service to improve the availability of the database table. If, for example, many users are accessing a database table, it becomes difficult to service the needs of all of those users with a single copy of the database table but may be considerably easier to service the needs of those users with a replica of the database table. Similarly, if users of a database table are widely geographically distributed (i.e., are in multiple different locations), it can be more efficient to service the needs of users with a replica of the database table that is located in closer proximity to the user.

When a database table is updated, an index table is also updated. An index table is a table that provides a sortable view of some or all of the data in the database table. The index table can be sorted on the index and searched using the index. An index table has a primary key (e.g., a partition key) and one or more secondary keys (e.g., a sort key). Typically, an index table has a single sort key. For example, a database table may contain a table of scores for a set of games. Each entry in the database table can include, for example, a user identifier, a game title, a high score, a number of wins, a number of losses, and other such data about the games. In this example, the user identifier may be the partition key and the game title may be the sort key. From this table, it may be easy to determine the top score for a certain user on a certain game, but it might be far more difficult to determine, for example, which user had the highest score ever recorded for a particular game. An index table can be used to simplify such a query. By creating an index table with a partition key of the game title and a sort key of the high score, the query can be satisfied using that index table while avoiding an expensive operation to scan the entire table.

In an example, if a new high score is recorded for a user in the database table, any index tables that reference the high score may be updated as a result of the new data. An index table may be updated if the data in an entry of a sort key is updated and may also be updated if any of the other data in the table is updated (e.g., if the index table has secondary data for, for example, wins and losses).

As with the database table, index tables may also be replicated to replica index tables upon being updated. As such replications can take time to complete, the replica index tables may not be immediately updated and, accordingly, a search to the index table may lag behind the update to the index table. A search or sort of the lagging replica index table may return out of date data, particularly if the search comes directly after a data table update.

This disclosure describes techniques for asynchronously updating index table replicas so that the index table replicas are initially consistent in high-speed volatile storage and are eventually durable and consistent with low-cost persistent storage. First, when an index table will be updated as a result of a database table update, the index table that is the primary index table (e.g., the leader) is updated. Second, the update is sent to each of the replicas, which are the secondary index tables (e.g., the followers).

Each of the replicas (e.g., the followers), in one example, stores the update to the index table in an in-memory copy of the replica index table. This in-memory copy of the replica index table is stored in high-speed volatile storage such as, for example, computer system memory. Additionally, each of the replicas queues the update for storage using a persistent storage medium. Then, asynchronously (i.e., in a separate process), the update is pulled from the queue and stored in the replica index table in persistent storage (e.g., on a hard drive or some other persistent storage). By processing the queue and storing the updates from the queue to the replica index table in persistent storage, the in-memory copy of the replica index table and the persistent storage copy of the replica index table become the same (e.g., they are synchronized).

While the asynchronous process is processing the queue, the in-memory copy of the replica index table is the authoritative copy of the replica index table, and queries made to the index table may be serviced by the in-memory copy of the replica index table. These queries may be serviced shortly after a database update because the in-memory copy of the replica index table is updated quickly and with low latency. After the queue is processed and the in-memory copy of the index table and the persistent storage copy of the replica index table become synchronized, queries made to the index table may be serviced by the persistent storage copy of the replica index table.

After each update is read from the queue and stored in the persistent storage copy of the replica index table, the database service may acknowledge the storage of the index table update to the primary index table. By acknowledging the storage of the index update in the persistent storage copy of the replica index table, the primary index table may receive information indicating a successful replication of the index update. Conversely, if the primary index table does not receive an acknowledgment of the storage of the index update in the persistent storage copy of the replica index table, the primary index table may queue the update for storage again. Such a lack of acknowledgment may occur when, for example, a process associated with a replica index table fails. By queuing the index update again, the eventual consistency and durability of the replica index tables may be ensured.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example environment 100 where a database service updates and asynchronously indexes database tables in accordance with at least one embodiment. Data 102 is received at a database service 104 for storage in a database table 106. The data 102, which may be data that adds, alters, or updates entries in the database table 106, may be received by the database service 104. The database service 104 may then store the data in the database table 106 so that it may be searched, sorted, processed, and/or retrieved. As described above, the data 102 may take many forms. It should be noted that a single database may have a plurality of database tables such as the database table 106.

Using the example described above, a first update to the database table 106 may add a new user to a table of users with a "USERID" of "001." This first update may include the data 102 "001" for the USERID field (e.g., the column) of an entry (e.g., the row) in the database that will be stored in the database table 106.

A second update to the database table 106 may add a PASSWORD to that user and may include the data 102 "my password" for the PASSWORD field of the entry in the database that is stored in the database table 106.

A third update to the database table 106 may change the PASSWORD for that user and may include the data 102 "my_new_password" for the PASSWORD field of the entry in the database that is stored in the database table 106.

As the data 102 is received by the database service 104 and stored in the database table 106, the database service 104 may update one or more replicas of the database table 108. Replicas of database table 108 may be maintained by a database service 104 to improve the durability of the database table 106. By replicating a database table 106 by, for example, making multiple copies of a database table 106, a database service 104 may ensure that, if one or more copies of the database table 106 are lost, destroyed, deleted, or corrupted, the data stored in the database table 106 can be recovered from one or more replicas of the database table 108.

It should be noted that each database table 106 may have a plurality of replica database tables 108. For example, a database table 106 may have a replica in each location (e.g., each datacenter) of a computing resource service provider, or may have a plurality of replicas in a single location to service the requests of a large number of customers. In one embodiment, the number of replica database tables 108 may be determined by policies of the computing resource service provider, or may be determined by values established by a user, or may be determined by an optimal configuration for providing access to the data stored in the database table 106. In some embodiments, there are two replica database tables 108 to provide durable (e.g., redundant) storage for the data in the database table 106.

The one or more replicas of database tables 108 may also be maintained by a database service 104 to improve the availability of the database table 106. For example, if multiple users, applications, or services request access to a database table 106, it becomes difficult to service the needs of all of those users with a single copy of the database table 106 but may be considerably easier to service the needs of those users, applications, or services using one or more replicas of the database table 108. Similarly, if users, applications, or services request access to a database table 108 and those users, applications, or services are widely geographically distributed (i.e., are in multiple different locations), it can be more efficient to service the needs of those users, applications, or services using a replica of the database table of the one or more replicas of the database table 108 that is located in closer proximity to the user, application, or service.

When a database table 106 is updated, an index table 112 may also be updated 110. As described above, an index table 112 is a table that provides a sortable view of some or all of the data in the database table 106. The index table 112 can be sorted on the index and searched using the index. An index table may have a partition key and a sort key. In some embodiments, the index table 112 has the same partition key as the database table 106 and a different sort key. In an embodiment the index table 112 has a partition key that is different from the partition key of the database table 106 and may have a sort key that is different from the sort key of the database table 106 or may have a sort key that is the same as the sort key of the database table 106. In an embodiment, the partition key and the sort key of the index table 112 are compound keys generated from other entries in the database table 106.

Using the example described above, the database table 106 may contain a table of scores for a set of games. Each entry in the database table 106 may include, for example, a user identifier, a game title, a high score, a number of wins, a number of losses, and other such data about the games. In the database table 106, the user identifier may be the partition key and the game title may be the sort key. From this database table 106, it may be easy to determine the top score for a certain user on a certain game but it might be more difficult to determine, for example, which user had the highest score ever recorded for a particular game without an expensive operation to read the entire database table 106 (e.g., a scan operation). An index table 112 may be used to simplify such a query. By creating an index table 112 with a partition key of the game title, a sort key of the high score, and the user identifier, the query for the user that had the highest score ever recorded for a particular game may be satisfied using the index table 112 with those partition and sort keys, and the expensive scan operation (e.g., reading the entire table to determine the data) on the database table 106 may be avoided. It should be noted that, although the example illustrated in FIG. 1 has a single index table for the database table 106, a database table 106 may have a plurality of index tables with different partition keys and sort keys to provide different indexes (i.e., different views) of the data in the database table 106.

As with the replication described for the database table 106, an index table 112 may also be replicated to one or more replica index tables 114 upon being updated 110. In one embodiment, the one or more replica index tables 114 are be updated 110 asynchronously by, for example, a separate process of the database service 104. As such replications can take time to complete, the replica index tables 114 may not be immediately updated and may instead be asynchronously replicated (i.e., asynchronously updated) as described herein. When replica index tables 114 are asynchronously updated, the replica index tables 114 may be made initially consistent by storing the update in high-speed volatile storage and may be made eventually durable and consistent by storing the update in low-cost persistent storage.

As with the database table 106, the index table 112 may have a plurality of replica index tables 114. For example, index table 112 may have a replica in each location (e.g., each datacenter) of a computing resource service provider, or may have a plurality of replicas in a single location to service the requests of a large number of customers. In one embodiment, the number of replica index tables 114 is determined by policies of the computing resource service provider. In one embodiment, the number of replica index tables 114 is determined by values established by a user. In one embodiment, the number of replica index tables 114 is determined by an optimal configuration for providing access to the data stored in the index table 112. In an embodiment, there are two replica index tables 114 to provide durable (e.g., redundant) storage for the data in the index table 112. In one embodiment, the number of replica index tables 114 for the index table 112 is the same as the number of replica database tables 108 for the database table 106.

When an index table 112 is updated as a result of an update to the database table 106, the index table 112 that is the primary index table (e.g., the leader) may be updated 110. The update may be sent to each of the replica index tables 114, which are the secondary index tables (e.g., the followers). In one embodiment, the replica index tables 114 (e.g., the followers) initially store the update to the replica index table in an in-memory copy of the replica index table. This in-memory copy of the replica index table may be stored in high-speed volatile storage such as, for example, computer system memory, flash drives, optical drives, or the like. Each of the replica index tables 114 may then queue the update for later storage using a persistent storage medium such as, for example, a hard drive, a tape drive, or the like.

Using a separate process (e.g., an asynchronous process) the update is, in one embodiment, pulled from the queue and stored in the copy of the replica index table in persistent storage. By processing the queue and storing the updates from the queue to the replica index table in persistent storage, the in-memory copy of the replica index table and the persistent storage copy of the replica index table may eventually become the same (e.g., they are synchronized).

While the asynchronous process is processing the queue, the in-memory copy of the replica index table may be the authoritative copy of the replica index table, and, in one embodiment, queries made to the replica index table are serviced by the in-memory copy of the replica index table. These queries may be serviced shortly after a database update because the in-memory copy of the replica index table is updated quickly (e.g., with low latency). After the queue is processed and the in-memory copy of the replica index table and the persistent storage copy of the replica index table become synchronized, queries made to the replica index table are, in one embodiment, serviced by the persistent storage copy of the replica index table.

After each update is read from the queue and stored in the persistent storage copy of the replica index table, the database service 104 may acknowledge the storage of the index table update 110 to the primary index table 112. By acknowledging the storage of the index table update 110 in the persistent storage copy of the replica index table, the primary index table 112 may receive information indicating a successful replication of the index table update 110. Conversely, if the primary index table 112 does not receive an acknowledgment of the storage of the index table update 110 in the persistent storage copy of the one or more replica index tables, the primary index table 112 may queue the update for storage again. Such a lack of acknowledgment may occur when, for example, a process associated with a replica index table fails. By queuing the index update again, the eventual consistency and durability of the replica index tables 114 may be ensured.

It should be noted that when data 102 is updated in a database table 106, data in an index table 112 may also be updated. For example, if a new high score is recorded for a user in the database table 106, any index tables 112 that reference the high score may be updated as a result of the new data 102. An index table 112 may be updated if the data in an entry of a sort key is updated, if data in an entry of the partition key is updated, or if any of the other data in the index table 112 is updated (e.g., if the index table 112 has secondary data for, for example, wins and losses).

Figure 2:
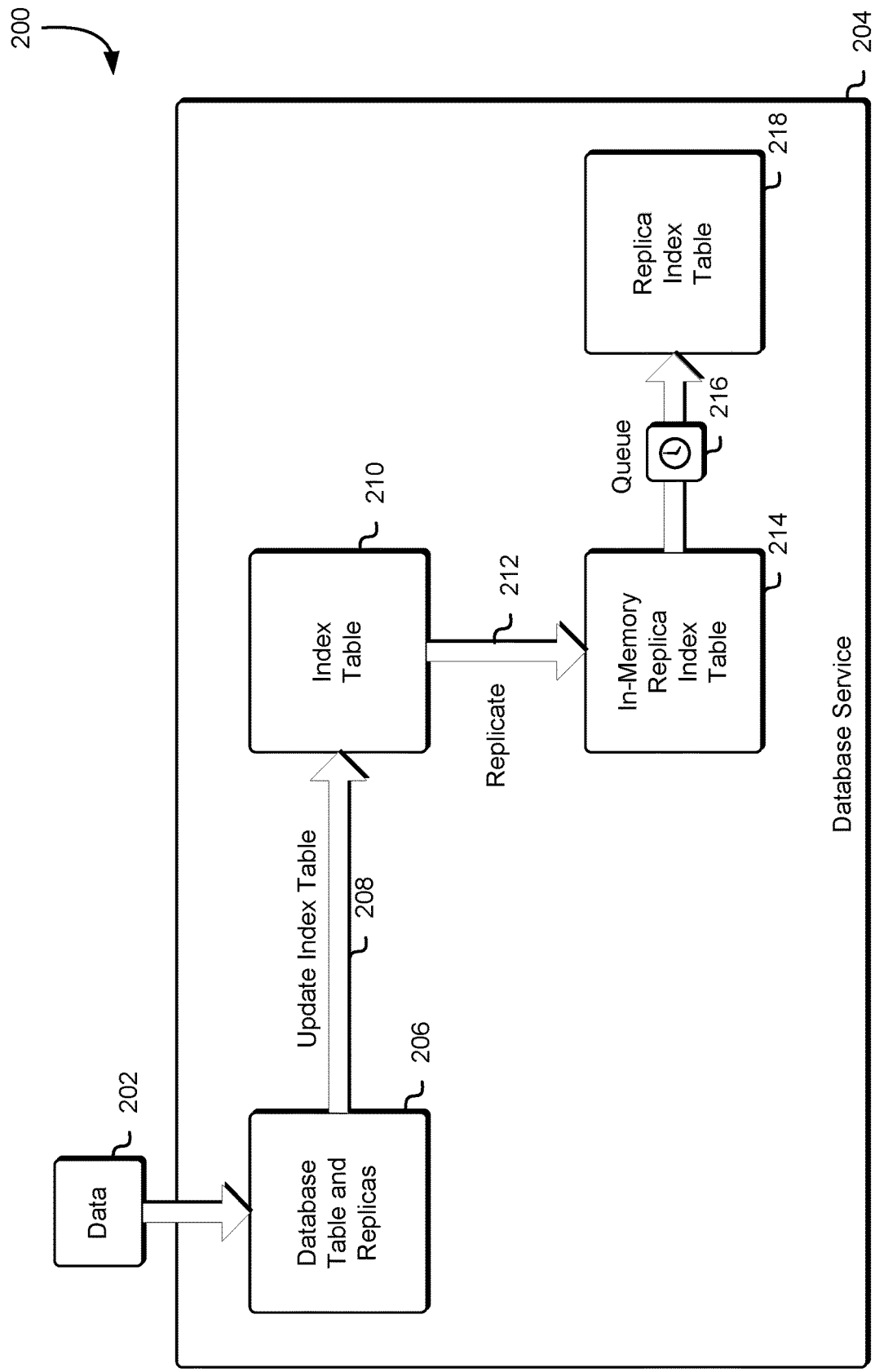
FIG. 2 illustrates an example environment where a database service asynchronously indexes database tables.

FIG. 2 illustrates an example environment 200 where a database service asynchronously indexes database tables as described in connection with FIG. 1 and in accordance with at least one embodiment. Data 202 is received by a database service 204 and stored in a database table and replicas 206 as described above. The update to the data in the database table and replicas 206 may cause the database service 204 to update 208 the index table 210, also as described above.

In one embodiment, when the index table 210 is created, the replica index table 218 is a copy of the index table 210, and the in-memory replica index table is a copy of the replica index table 218. Each of the index table 210, the replica index table 218, and the in-memory replica index table 214 may contain the same data. For example, each of the index table 210, the replica index table 218, and the in-memory replica index table 214 may include data that has a high score of "1000" for user "101" for game "Game 1."

When an update 208 to the index table 210 is received, the database service 204 may store the update 208 in the index table 210. After the update 208 to the index table 210 is stored, the index table 210 may include data that is different from the data in the replica index table 218 and/or the data in the in-memory replica index table 214. For example, the update to the index table 210 may be an update to set a high score of "1200" for user "101" for game "Game 1." After the update 208 to the index table 210 is stored, the index table 210 may include data that has a high score of "1200" for user "101" for game "Game 1" while the replica index table 218 and the in-memory replica index table 214 may include data that has a high score of "1000" for user "101" for game "Game 1." After the update 208, but before the replication described below, the index table 210 is the only table with the correct data (e.g., a high score of "1200" for user "101" for game "Game 1").

In one embodiment, the database service 204 replicates 212 the update from the index table 210 to one or more replica index tables by first storing the update in an in-memory replica index table 214. As described above, the in-memory replica index table 214 is a copy of the replica index table 218. The in-memory replica index table 214 is a copy of the replica index table 218 that is stored using high-speed storage such as, for example, volatile computer system memory. When the update is stored in the in-memory replica index table 214, the in-memory replica index table 214 may include data that is the same as the data in the index table 210, but may include data that is different from the data that is stored in the replica index table 218. After the update from the index table 210 to the in-memory replica index table 214 is stored, the index table 210 and the in-memory replica index table 214 includes data that has a high score of "1200" for user "101" for game "Game 1" while the replica index table 218 may include data that has a high score of "1000" for user "101" for game "Game 1." After the update from the index table 210 to the in-memory replica index table 214 is stored, both the index table 210 and the in-memory replica index table 214 have the correct data (e.g., a high score of "1200" for user "101" for game "Game 1") and, accordingly, the in-memory replica index table 218 may be used to service requests for data that use the index table 210. Conversely, the replica index table 218 does not have the correct data and, accordingly, may not be used to service requests for data that use the index table 210.

In one embodiment, the database service 204 then stores the update that was replicated in the in-memory replica index table 214 in a queue 216 for eventual storage in the replica index table 218. After the update that was replicated in the in-memory replica index table 214 is stored in the queue 216 for eventual storage in the replica index table 218, the index table 210 and the in-memory replica index table 214 may still include data that has a high score of "1200" for user "101" for game "Game 1" while the replica index table 218 may still include data that has a high score of "1000" for user "101" for game "Game 1." Accordingly, the in-memory replica index table 214 may be used to service requests for data that use the index table 210, and the replica index table 218 may not be used to service requests for data that use the index table 210.

In one embodiment, the database service 204 then begins asynchronously storing the updates in the queue 216 in the replica index table 218 using, for example, an asynchronous process (e.g., a separate process). When the update 208 is received from the queue and used to store the update in the replica index table 218, the index table 210, the in-memory replica index table 214, and the replica index table 218 may include data that has a high score of "1200" for user "101" for game "Game 1." Accordingly, the replica index table 218 is consistent (also referred to herein as "synchronized") with the index table, and the replica index table 218 may be used to service requests for data that use the index table 210.

It should be noted that while the examples described herein describe a queue that is used to send the update that was replicated in the in-memory replica index table 214 to the replica index table 218, other data structures and/or methods may be used to send the update that was replicated in the in-memory replica index table 214 to the replica index table 218. For example, an event message may be generated by the database service 204, and the replica index table 218 may receive that event message and use the event message to store the update in the replica index table 218. Such an event message may be sent to the replica index table or may be broadcast to a plurality of tables in the database, and those tables that are configured to process the event message may then store the update. As may be contemplated, other data structures and/or methods may be used to send the update that was replicated in the in-memory replica index table 214 to the replica index table 218 and such other data structures and/or methods that may be used to send the update that was replicated in the in-memory replica index table 214 to the replica index table 218 may be considered as within the scope of the present disclosure.

In the example illustrated in FIG. 2, the index table 210 is the primary index table (also referred to herein as the "leader") and the one or more replica index tables (e.g., the in-memory replica index table 214 and the replica index table 218) are the followers as described above. In some embodiments, there are no designated leaders and followers. In one such embodiment where there are no designated leaders and followers, any one of the replica index tables (e.g., the in-memory replica index table 214 and the replica index table 218) receive the update and become, for that update, the leader. The leader then replicates the update to the followers (e.g., the other replica index tables) as described above.

In another such embodiment where there are no designated leaders and followers, each of the replica index tables (e.g., the in-memory replica index table 214 and the replica index table 218) receives the update and the final value is reached by, for example, a consensus protocol. For example, if there are three replica index tables and two of them get the same update then, by consensus, that would be the correct value and that correct value may be replicated to the third replica index table. In another example, if there are three replica index tables and only one of them gets the update, then that update may be rejected. In one embodiment where an update is acknowledged by the replica index tables as described above, the acknowledgment may not be sent until a consensus is reached.

Figure 3:
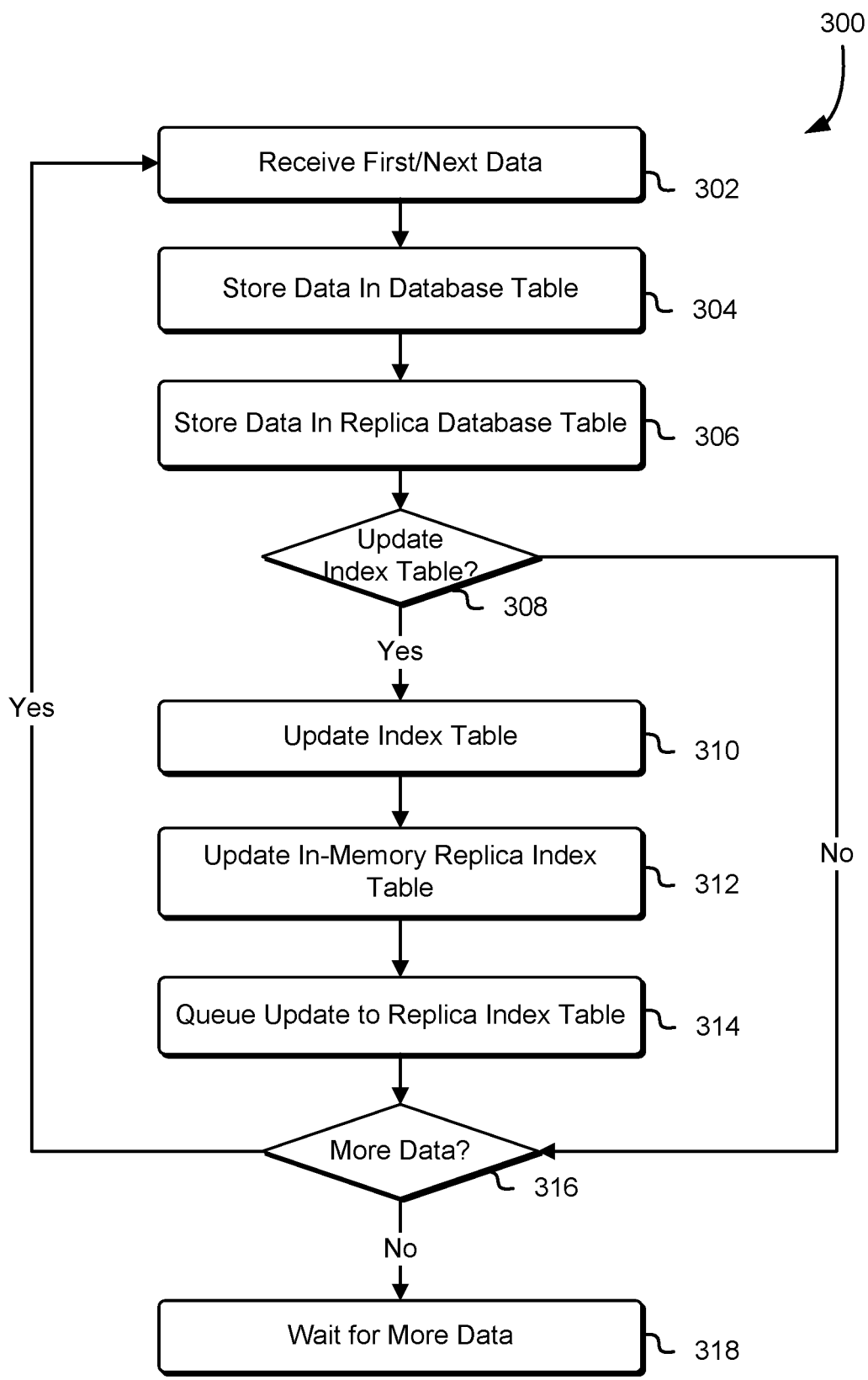
FIG. 3 illustrates an example process for asynchronously indexing database tables.

FIG. 3 illustrates an example process 300 for asynchronously indexing database tables as described in connection with FIG. 1 and in accordance with at least one embodiment. A database service such as the database service 104 described at least in connection with FIG. 1 may perform the example process 300 illustrated in FIG. 3. The database service may first receive 302 data to be stored in a database table as described above. The database service may next store 304 the data in the database table and store 306 the data in one or more replica database tables, also as described above.

As a result of the updated data, the database service then determines 308 whether one or more index tables should be updated. The database service may determine whether to update an index table based at least in part on the data that was updated. For example, if there is a plurality of index tables associated with the database table, one or more of the plurality of index tables may be updated if the index tables store and/or reference data that is stored in the database table. Using the example above, with a database table that includes a table of scores for a set of games and where each entry in the database table includes a user identifier, a game title, a high score, a number of wins, a number of losses, and other such data about the games, the user identifier may be the partition key for the database table and the game title may be the sort key for the database table. An index table with a partition key of the game title and a sort key of the high score may also be created, and the index table may include the partition key of the database table (e.g., the user identifier). In this example, an update to the number of wins for a user and game in the database table may cause the database service to determine that the index table with a partition key of the game title and a sort key of the high score should not be updated. Conversely, an update to the high score for a user and game in the database table may cause the database service to determine that the index table with a partition key of the game title and a sort key of the high score should be updated.

If the database service determines 308 to update one or more index tables, the database service then updates 310 the index table (e.g., the leader) and also updates 312 the in-memory replica index table and queues 314 the update for storage in the replica index table, all as described above. After the database service updates 310 the index table, updates 312 the in-memory replica index table, and queues 314 the update for storage in the replica index table, an asynchronous process (e.g., a separate process) of the database service may synchronize the asynchronously indexed database tables as described in the example process 400 illustrated in FIG. 4.

The database service next determines 316 whether there is more data to process (i.e., more updates) and, if so, receives 302 the next data to be stored in the database table. If the database service does not determine that there is more data to process, the database service may wait 318 for more data to be received.

Figure 4:
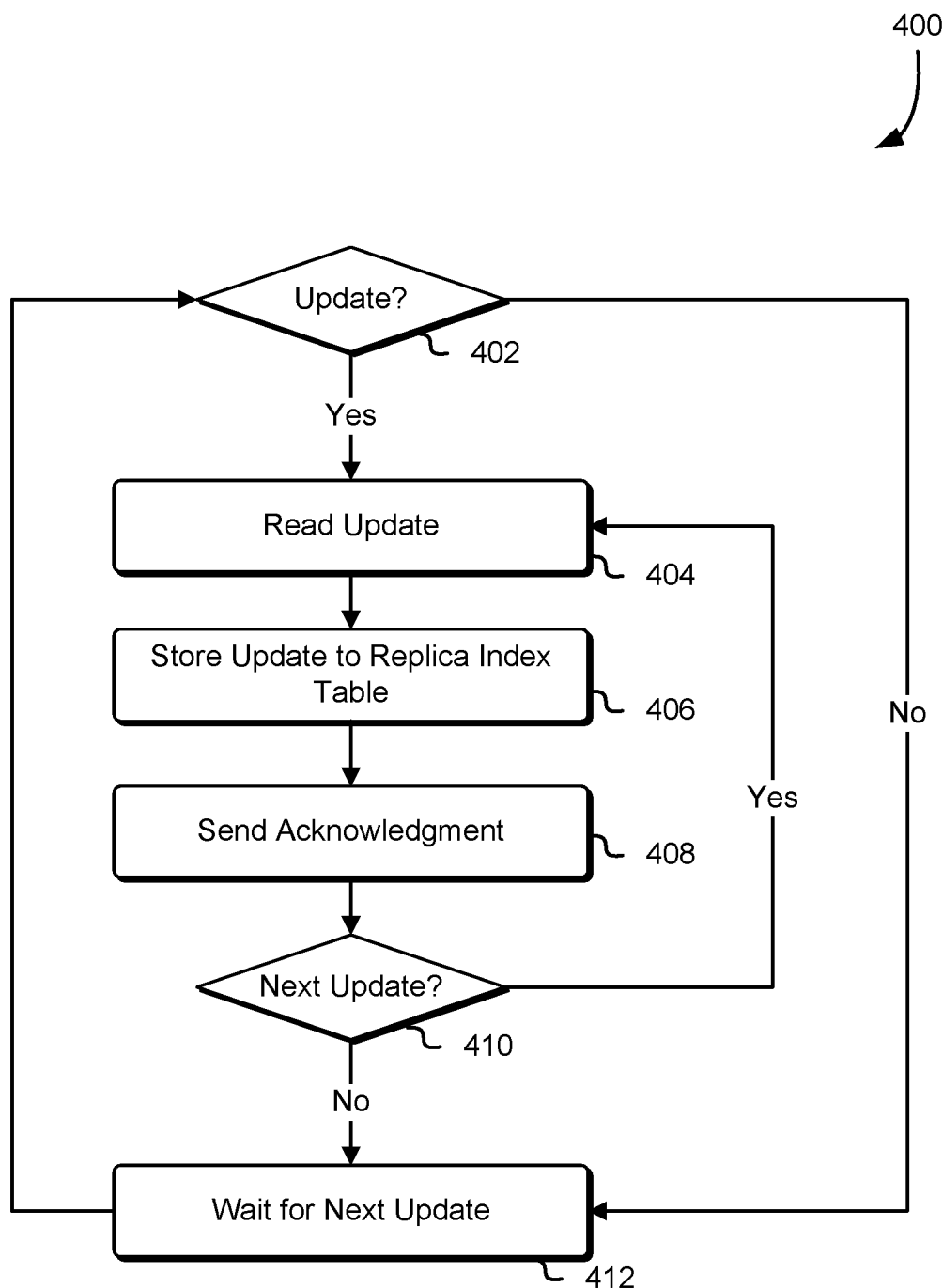
FIG. 4 illustrates an example process for synchronizing asynchronously indexed database tables.

FIG. 4 illustrates an example process 400 for synchronizing asynchronously indexed database tables as described in connection with FIG. 1 and in accordance with at least one embodiment. A database service such as the database service 104 described at least in connection with FIG. 1 may perform the example process 400 illustrated in FIG. 4. In the example process 400 illustrated in FIG. 4, an asynchronous process (e.g., a separate process) of a database service such as the database service 104 described at least in connection with FIG. 1 may perform the example process 400 illustrated in FIG. 4.

The database service first determines 402 whether there is an update to be processed. The database service may determine whether there is an update to be processed if, for example, there are items in a queue of updates as described above. If it is not the case that the database service determines 402 that there is an update to be processed, the database service may wait 412 for the next update. If the database service determines 402 that there is an update to be processed, the database service may next read 404 the update by, for example, reading the update from the queue as described above.

The database service may then store 406 the update to the replica index table and may send 408 an acknowledgment that the update was stored in the replica index table. As described above, while the asynchronous process is processing the updates in the queue, the in-memory copy of the replica index table is the authoritative copy of the replica index table, and queries made to the replica index table may be serviced by the in-memory copy of the replica index table. After the updates in the queue are processed and the in-memory copy of the replica index table and the persistent storage copy of the replica index table become synchronized with the index table, queries made to the replica index table may be serviced by the persistent storage copy of the replica index table. In some embodiments, when the database service does send 408 an acknowledgment that the update was stored in the replica index table, this acknowledgment may be used to determine that the replica index table is synchronized with the index table and that queries made to the index table may be serviced by the persistent storage copy of the replica index table.

As described above, by acknowledging the storage of the index update in the persistent storage copy of the replica index table, the index table (e.g., the primary index table) may also receive information indicating a successful replication of the index update. Conversely, if the index table does not receive an acknowledgment of the storage of the index update in the persistent storage copy of the replica index table, the index table may queue the update for storage again. Such a lack of acknowledgment may occur when, for example, a process associated with a replica index table fails. By queuing the index update again, the eventual consistency and durability of the replica index tables may be ensured.

After the database service may send 408 an acknowledgment that the update was stored in the replica index table, the database service may determine 410 whether there is a next update in the queue to be processed. In one embodiment, multiple updates to the queue may be received when, for example, the updates are batched together and sent to the queue using a batch process. For example, the database service may receive multiple updates to the index table and may store those multiple updates in the in-memory replica index table as described in connection with example process 300 described in connection with FIG. 3. The database service may not immediately store the updates in the queue and may instead collect a set (or batch) of updates to be stored in the queue using a batch process. Then, at a determined time, the database service may send a batch update and store the collected set of updates to the replica index table using a batch process (e.g., a process that sends the collected set of updates as a single update). The determine time to send the update may be based at least in part on a threshold value for a minimum number of updates in the set, a threshold value for a maximum number of updates in the set, one or more performance characteristics of the database service (e.g., a speed of processing, an amount of available memory, an amount of network bandwidth), a timer (e.g., batch updates may be sent every second, minute, etc.), the type of persistent storage used for the replica index table, or a combination of these and/or other such factors.

If the database service does determine 410 that there is a next update in the queue to process, the database service may read 404 the next update from the queue and process it. If the database service does not determine 410 that there is a next update in the queue to process, the database service may wait 412 for the next update.

Figure 5:
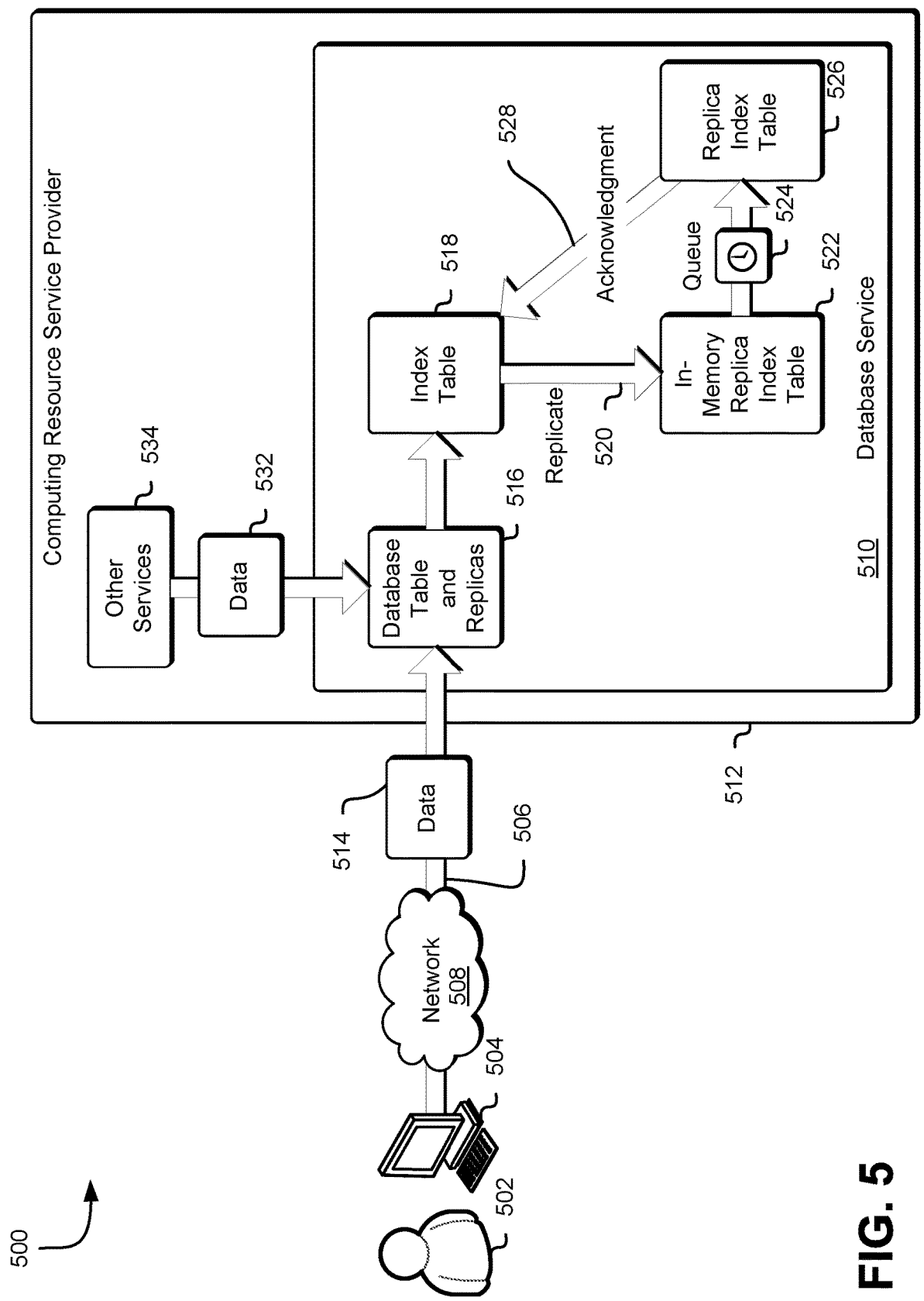
FIG. 5 illustrates an example environment where a database service asynchronously indexes database tables and processes data requests for asynchronously indexed database tables.

FIG. 5 illustrates an example environment 500 where a database service asynchronously indexes database tables and processes data requests for asynchronously indexed database tables as described in connection with FIG. 1 and in accordance with at least one embodiment. In the example environment 500 illustrated in FIG. 5, a user 502 uses a client computing device 504 to connect 506 to a variety of services provided by a computing resource service provider 512. The user 502 may use the client computing device 504 to connect 506 to the computing resource service provider 512 over a network 508 such as those networks described herein. The computing resource service provider 512 may provide a distributed, virtualized, and/or datacenter environment within which one or more applications, processes, services, virtual machines, and/or other such computer system entities may be executed. The user 502 may be a person, or may be a process running on one or more remote computer systems, or may be some other computer system entity, user, or process.

Commands from the user 502 to the computing resource service provider 512 may originate from an outside computer system or from within the computing resource service provider environment. The commands to connect 506 to the computing resource service provider 512 may be sent to the computing resource service provider 512 and/or the services operating in the environment therein, without the direct intervention of the user 502 (i.e., commands to connect 506 to the computing resource service provider 512 may be generated automatically in response to one or more events). The user 502 may be a privileged user associated with a customer of the computing resource service provider 512. The user 502 may also be a privileged user associated with the computing resource service provider 512.

The computing resource service provider 512 may provide access to one or more host machines, may provide access to one or more virtual machine instances as may be operating thereon, or may provide access to one or more services in an environment therein. The one or more services provided by the computing resource service provider 512 may also be implemented as and/or may utilize one or more virtual machine instances as may be operating on host machines operating within the computing resource service provider 512 environment. For example, the computing resource service provider 512 may provide a variety of services to users including, but not limited to, the user 502. The users such as the user 502 may communicate with the computing resource service provider 512 via an interface such as a web services interface or any other type of interface. While the example environment illustrated in FIG. 5 shows a single connection or interface to the computing resource service provider 512, each of the services operating in an environment therein may have its own interface and, generally, subsets of the services may have corresponding interfaces in addition to or as an alternative to the single interface.

In an example of a type of service operating within the environment of the computing resource service provider 512, a virtual computer system service may be a collection of computing resources configured to instantiate virtual machine instances on behalf of a customer such as the user 502. The user 502 is the customer associated with a request to store data in a database as described above. The user 502 that generates the request to store data may be the customer of the computing resource service provider 512 that is associated with the data set that is associated with the request. The user 502 that generates the request to store data may be the customer associated with the storage request where the request is to store data on behalf of another user, service, or computer system entity. The user 502 may become associated with the data set and/or the storage request as a result of owning the data set that will be stored and/or as a result of requesting the storage of the data (i.e., as a result of generating the storage request).

The user 502 may interact with a service such as the database service 510 of the computing resource service provider 512 (via appropriately configured and authenticated API requests) to generate data storage requests on virtual machine instances that are instantiated on physical computing devices hosted and operated by the computing resource service provider 512.

As described above, a user 502 may generate a request to store data 514. A database service 510 may receive the request to store the data 514. The database service 510 may then store the data 514 in the database tables and replicas 516 as described above. For example, when the database service 510 receives a request to store data 514, the database service 510 may store the data 514 in the database table and also replicate the data to the replica database tables as described above.

The database service 510 may be a collection of computing resources that operate collectively to process requests to store data. The computing resources configured to process requests to store data include at least one of: computer systems (the computer systems including processors and memory), networks, storage devices, executable code, services, processes, modules, or applications. The computing resources configured to process requests to store data may also include virtual systems that are implemented on shared hardware hosted by, for example, a computing resource service provider such as the computing resource service provider 512. The database service 510 may be implemented as a single system or may be implemented as a distributed system, with a plurality of instances operating collectively to process requests to store data. The database service 510 may operate using computing resources (e.g., databases and/or virtual machine instances) that enable the database service 510 to store, locate, and retrieve data quickly, to allow operations to be performed in response to requests to store data, to allow data to be searched, and to allow data to be retrieved from database storage.

The database service 510 may also maintain data and/or metadata associated with the stored data in a manner such that, when a request to retrieve a set of data is received, the data can be located and provided (or streaming data object can be initiated) in a response to the request. As noted, data stored by the database service 510 may be organized into data objects which may be stored. The data objects may have arbitrary sizes except, in some embodiments, may have constraints on size or durability. Thus, the database service

510 may manage the storage of numerous data objects of varying sizes. The database service 510 may cause the data objects to be stored in storage resources controlled by the database service 510, may cause the data objects to be stored using resources controlled by some other service such as a data storage service, or may cause the data objects to be stored using a combination of these storage methods. The database service 510 may also operate as a key value store that associates the data objects with identifiers of the data objects that may be used to retrieve or perform other operations in connection with the data objects stored by the database service 510. The database service 510 may also generate metadata associated with the data objects and may cause such metadata to be stored with the data objects.

After the data 514 is stored in the database tables and replicas 516, an update to the index table 518 may be generated and the update stored in the index table 518. The update may then be replicated 520 to the in-memory replica index table 522, stored in the queue 524, and stored in the replica index table 526, all as described above. After the update is stored in the replica index table 526, an acknowledgment 528 may be sent to the index table 518.

In an embodiment, an update that is stored in the index table 518 is maintained in a list of updates until the acknowledgment 528 is received from the replica index table 526. In such an embodiment, the database service 510 may periodically verify that each update is acknowledged and may resend any updates that are not acknowledged within some determined period of time (i.e., the database service may reissue the command to replicate an update that is not acknowledged). In one embodiment, the database server maintains a list of updates that are stored in the queue 524 so that the database service may periodically verify that each update that is stored in the queue is also acknowledged. In such an embodiment, the database service may reissue the command to store the update in the queue for any update that is not acknowledged.

It should be noted that, while the example described above describes data 514 being received from outside the environment of the computing resource service provider 512, the data may also be generated by services operating within the environment of the computing resource service provider 512. For example, other services 534 within the environment of the computing resource service provider 512 can generate data 532 for storage using the techniques described herein. Such data 532 can be provided to the database service 510 and stored with replicated indexes using the techniques described herein (e.g., the data 532 may be stored in the database tables and replicas 516, stored in the index table 518, replicated 520 to the in-memory replica index table 522, stored in the queue 524, and stored in the replica index table 526. Such other services 534 within the environment of the computing resource service provider 512 that may generate data 532 for storage using the techniques described herein may include, but may not be limited to, data storage services, archival storage services, virtual machine services, encryption services, authorization services, authentication services, encryption key services, web services, and other such services.

Although not shown in the example illustrated in FIG. 5, the database service 510 may maintain a number of logs associated with the asynchronously indexing database tables. In one embodiment, the database table of the database table and replicas 516 may have an associated write-ahead log and the replica tables of the database table and replicas 516 may have a replicated write-ahead log. As used herein, a write-ahead log is a log of all transactions associated with the database table. In one embodiment, when an update is provided to the database table, the update is written to a log before it is applied. The write-ahead log (also referred to herein as a "transaction log") allows the database service 510 to redo transactions (e.g., updates) that do not complete successfully and/or to undo transactions that result in errors. Update information and information usable to undo the update may be written to the transaction log. In one embodiment, the replicated write-ahead log is a replica of the write-ahead log and the replicated write-ahead log may be used to update the replicas (i.e., the replicated write-ahead law is the mechanism for replication).

The index table 518 may also have a write-ahead log and the replica index tables (e.g., the in-memory replica index table 522 and the replica index table 526) may also have replicated write-ahead logs that may be used to update the replica index tables. In one embodiment where there are no leaders and followers, each of the index tables may have a write-ahead log that is a replica of the other write-ahead logs (e.g., there may be no distinction between the write-ahead log and the replicated write-ahead log). When the index table 518 and the replica index tables (e.g., the in-memory replica index table 522 and the replica index table 526) have write-ahead logs that may be used to update the replica index tables, the updates to the write-ahead logs may be acknowledged by the database service 510. Such acknowledgments may be provided synchronously so that an update to the write-ahead logs is not acknowledged until at least a quorum of index tables has acknowledged the update. When such acknowledgments are provided synchronously, the database service 510 may delay sending the next update and/or may resend the previous update if the acknowledgments are not received.

Figure 6:
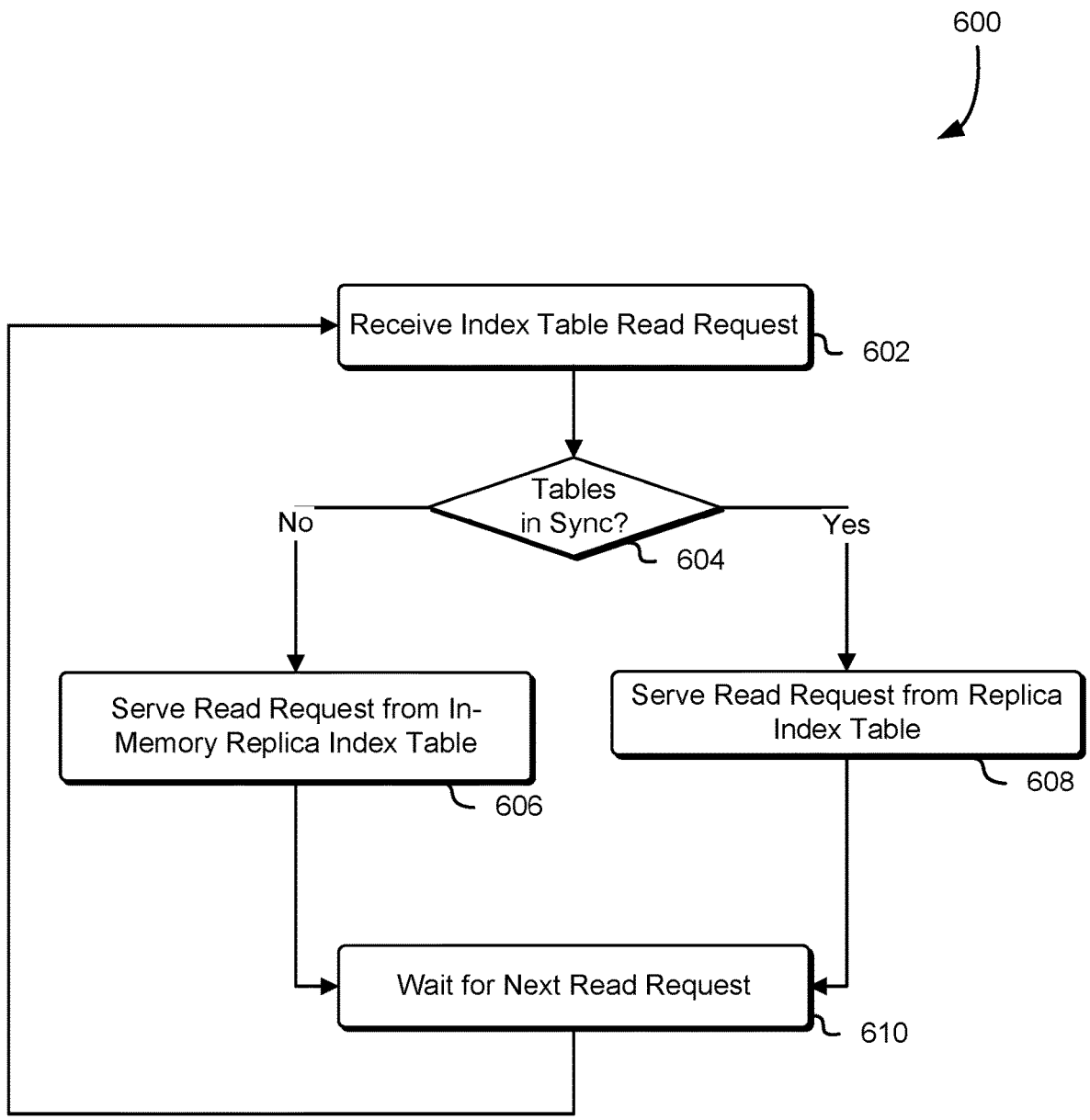
FIG. 6 illustrates an example process for reading from asynchronously indexed database tables.

FIG. 6 illustrates an example process 600 for reading from asynchronously indexed database tables as described in connection with FIG. 1 and in accordance with at least one embodiment. A database service such as the database service 104 described at least in connection with FIG. 1 may perform the example process 600 illustrated in FIG. 6. The database service may receive 602 an index table read request at a replica index table. The database service may first determine 604 whether the in-memory replica index table and the replica index table (e.g., the copy of the replica index table stored in persistent storage) are synchronized. The in-memory replica index table and the replica index table are synchronized (also referred to herein as "in sync") if they contain the same data and/or if they have the same updates stored. In some embodiments, the in-memory replica index table and the replica index table are synchronized if each update has been acknowledged. In some other embodiments, the in-memory replica index table and the replica index table are synchronized if there are no updates to be processed in the queue. In some embodiments, the updates to the tables have a log sequence number ("LSN") which is updated when an update is processed. In such an embodiment, the in-memory replica index table and replica index table are in sync when the LSN for each respective table is the same. For example, if an in-memory replica index table has an LSN of five and the corresponding replica index table has an LSN of four, the tables may not be in sync. In another example, if an in-memory replica index table has an LSN of five and the corresponding replica index table also has an LSN of five, the tables may be in sync.

If the database service does not determine 604 that the in-memory replica index table and the replica index table are synchronized, the database service may determine that the in-memory replica index table is the most current and may serve 606 the index table read request from the in-memory replica index table. Conversely, if the database service does determine 604 that the in-memory replica index table and the replica index table are synchronized, the database service may determine that the replica index table (e.g., the copy of the replica index table stored in persistent storage) is the most current and may serve 608 the index table read request from the replica index table. Finally, the database service may wait 610 for the next read request.

Figure 7:
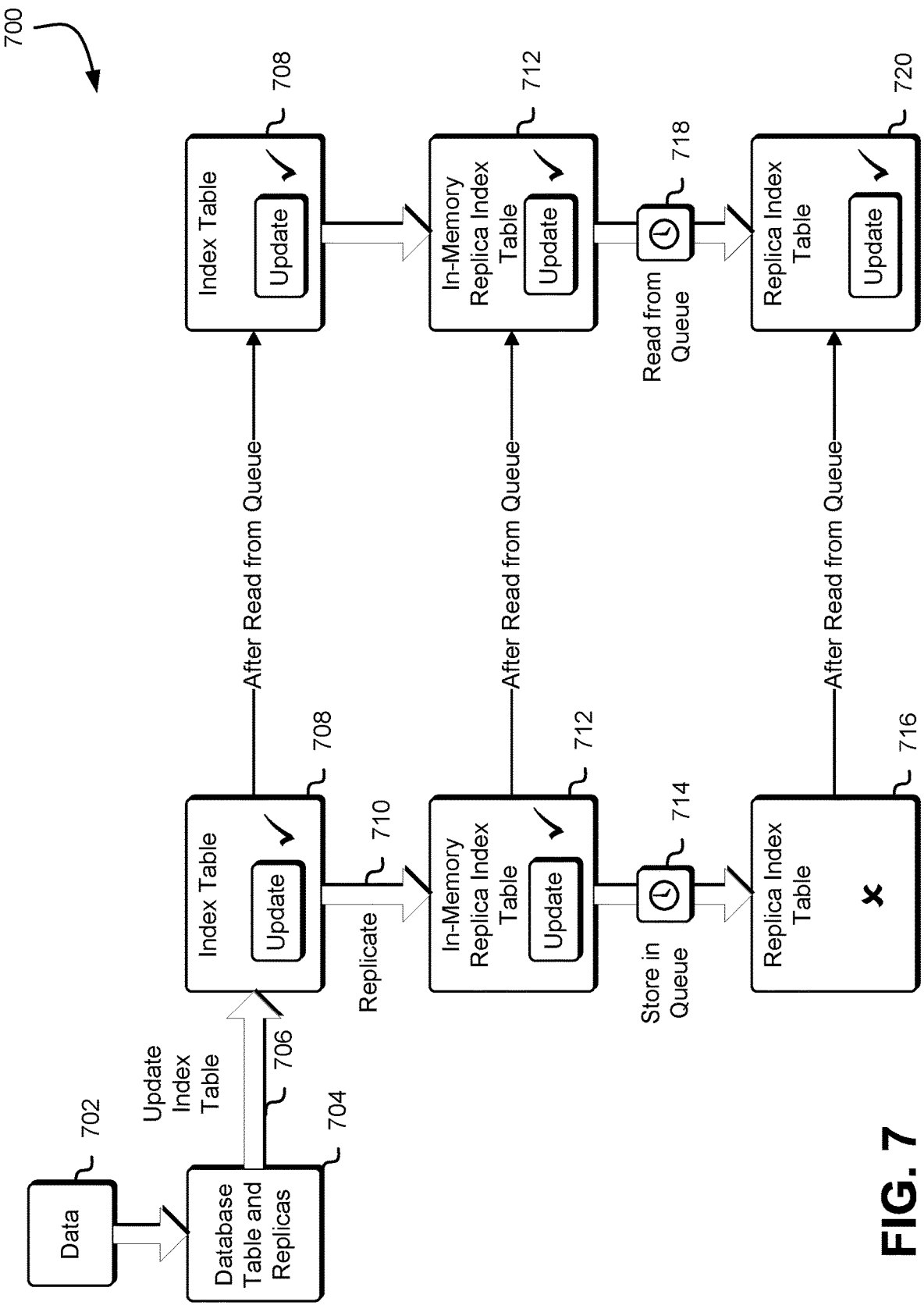
FIG. 7 illustrates an example environment where asynchronously indexed database tables are made eventually consistent.

FIG. 7 illustrates an example environment 700 where asynchronously indexed database tables are made eventually consistent as described in connection with FIG. 1 and in accordance with at least one embodiment. Data 702 is received by the database service such as the database service 104 described at least in connection with FIG. 1 and stored in a database table and replicas 704 as described above. The update to the data in the database table and replicas 704 may cause the database service to update 706 the index table 708, also as described above, replicate 710 the update to the in-memory replica index table 712, and store the update in the queue 714, all as described above.

In the example illustrated in FIG. 7, the index table 708 has the update (as indicated by the "check" mark) as a result of the update 706, and the in-memory replica index table 712 also has the update as a result of the operation to replicate 710 the update to the in-memory replica index table 712. Prior to reading the update from the queue, the replica index table 716 may not have the update (as indicated by the "X" mark).

After the database service has read the update from the queue 718 and stored the update in the replica index table 720 (which may be the same as the replica index table 716), the index table 708 has the update (again, as indicated by the "check" mark), the in-memory replica index table 712 also has the update, and the replica index table 720 also has the update (as indicated by the "check" mark).

Figure 8:
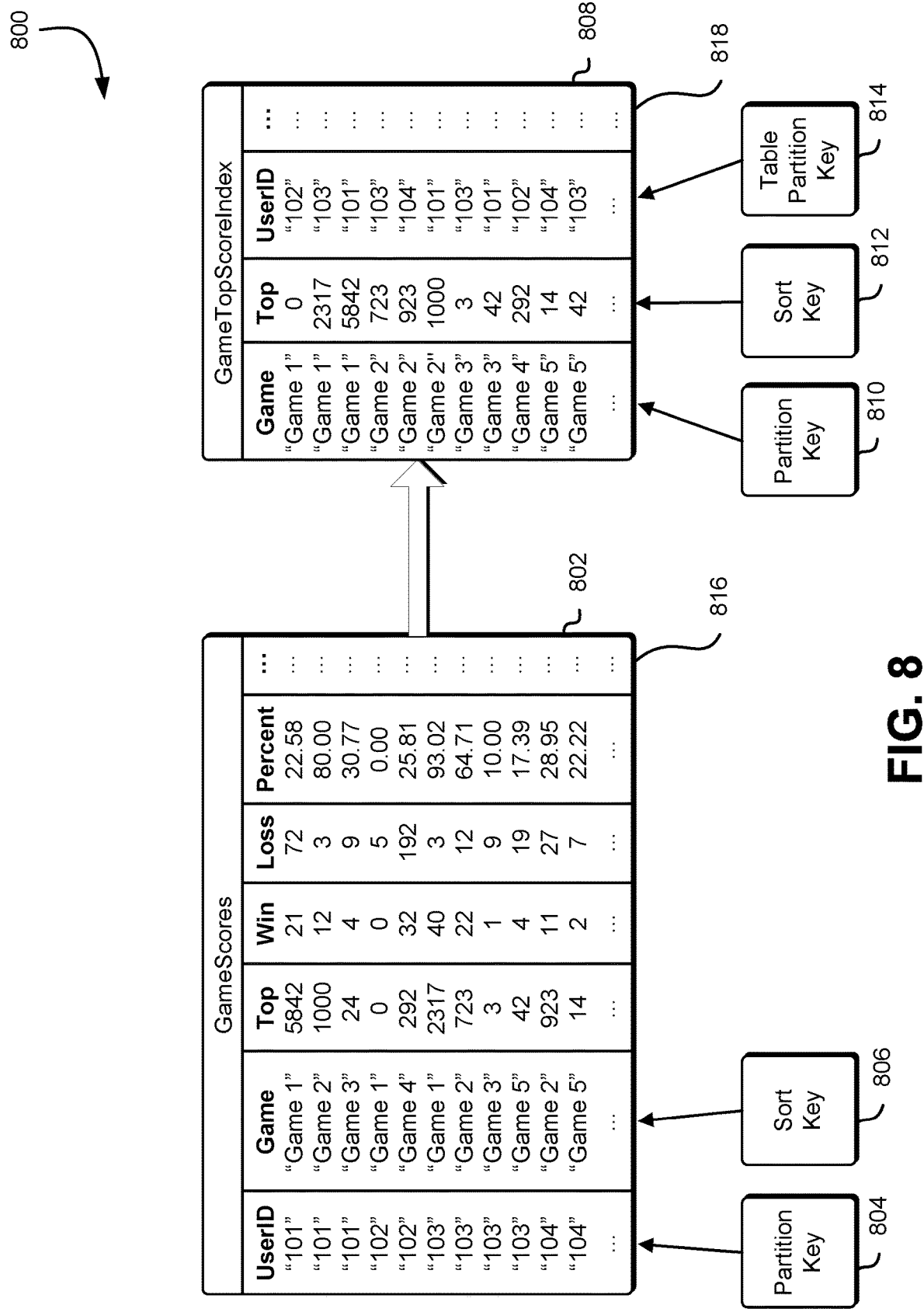
FIG. 8 illustrates an example diagram of an index table.

FIG. 8 illustrates an example diagram 800 of an index table as described in connection with FIG. 1 and in accordance with at least one embodiment. In the example diagram 800 illustrated in FIG. 8, a database table of game scores 802 ("GameScores") has, as a partition key 804, the "UserID" field and, as a sort key 806, the "Game" field. Each of the entries in the database table of game scores 802 has a "UserID" field (e.g., the partition key 804), a "Game" field (e.g., the sort key 806), a top score field ("Top"), a number of wins field ("Win"), a number of losses field ("Loss"), and a win percentage field ("Percent"). Each of the entries in the database table of game scores 802 may include one or more other fields 816 that are not illustrated in the example diagram 800.

An index table 808 ("GameTopScoreIndex") of the database table of game scores 802 has, as a partition key 810, the "Game" field and, as a sort key 812, the "Top" field. Each of the entries in the index table 808 may also include one or more other fields 818 that are not illustrated in the example diagram 800. In the example illustrated in FIG. 8, the index table 808 includes, as a data field, the "UserID" field, which is the table partition key 814 (e.g., the partition key 804 for the database table of game scores 802. The data for the table partition key 814 may be included in the index table to enable secondary queries to be made. For example, if a query on the index table 808 returns a result that the user with a "UserID" of "101" has the top score for the game "Game 1," that "UserID" may be used to determine the win percentage for that user and game (e.g., "22.58 percent").

An index table such as the index table 808 of the database table of game scores 802 that has, as a partition key 810, the "Game" field and, as a sort key 812, the "Top" field may be referred to herein as a "global index" or as a "global secondary index." A global secondary index is an index table where the partition key of the index table is different from the partition key of the database table.

Figure 9:
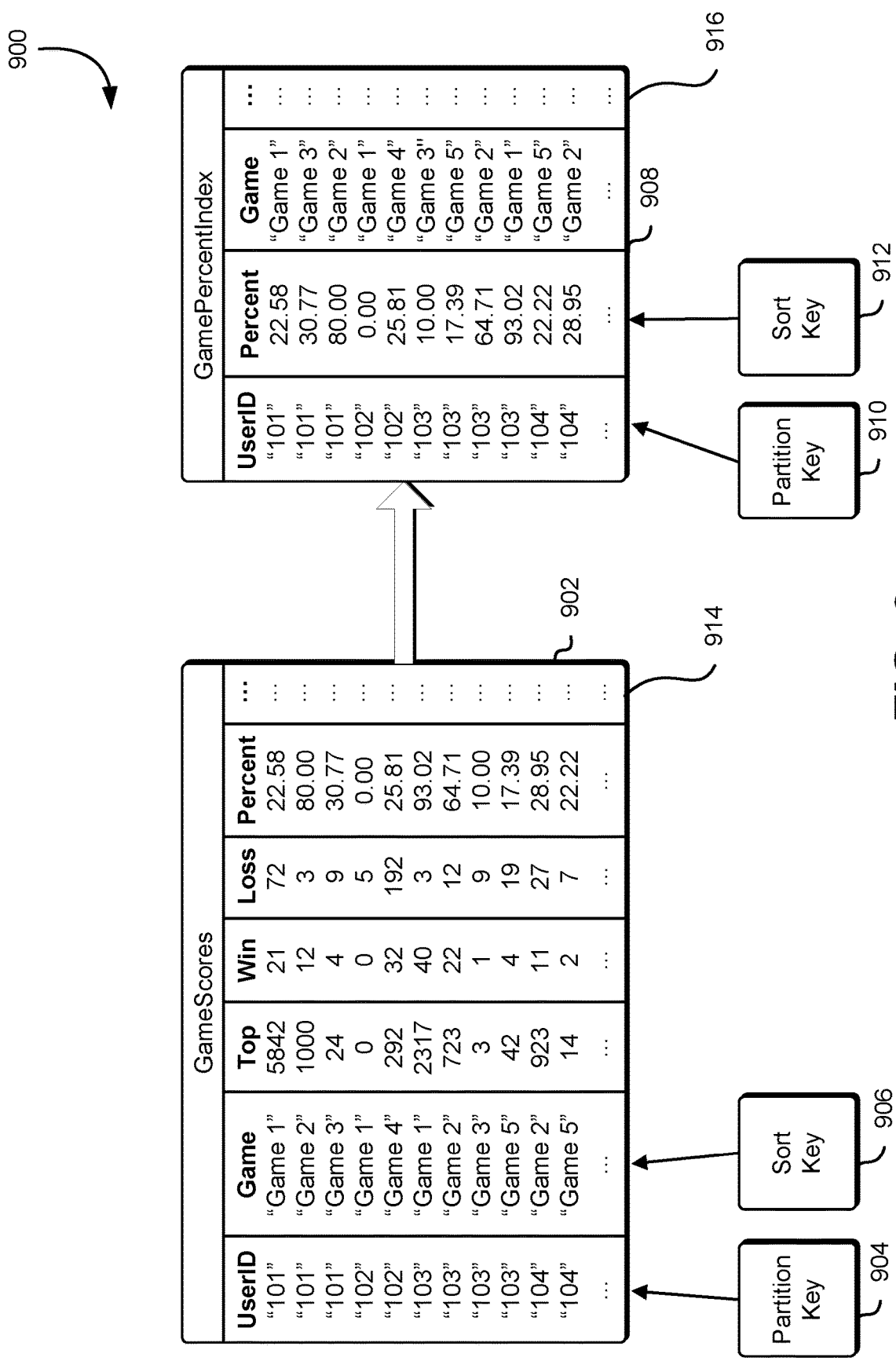
FIG. 9 illustrates an example diagram of an index table.

FIG. 9 illustrates an example diagram 900 of an index table as described in connection with FIG. 1 and in accordance with at least one embodiment. In the example diagram 900 illustrated in FIG. 9, a database table of game scores 902 ("GameScores") is the same as the database table of game scores 802 described in connection with FIG. 8. The database table of game scores 902 has, as a partition key 904, the "UserID" field and, as a sort key 906, the "Game" field. Each of the entries in the database table of game scores 902 has a "UserID" field (e.g., the partition key 904), a "Game" field (e.g., the sort key 906), a top score field ("Top"), a number of wins field ("Win"), a number of losses field ("Loss"), and a win percentage field ("Percent"). Each of the entries in the database table of game scores 902 may also include one or more other fields 914 that are not illustrated in the example diagram 900.

An index table 908 ("GamePercentIndex") of the database table of game scores 902 has, as a partition key 910, the "UserID" field and, as a sort key 912, the "Percent" field. Each of the entries in the index table 908 may also include one or more other fields 916 that are not illustrated in the example diagram 900. In the example illustrated in FIG. 9, the index table 908 also includes the "Game" field which may be provided as a result of a query. For example, a query on the index table 908 to determine the highest win percentage for a user with a "UserID" of "103" may return a result that the user with a "UserID" of "103" has a top win percentage of "93.02 percent" for the game "Game 1."

An index table such as the index table 908 of the database table of game scores 902 that has, as a partition key 910, the "UserID" field and, as a sort key 912, the "Percent" field may be referred to herein as a "local index" or as a "local secondary index." A local secondary index is an index table where the partition key of the index table is the same as the partition key of the database table.

Figure 10:
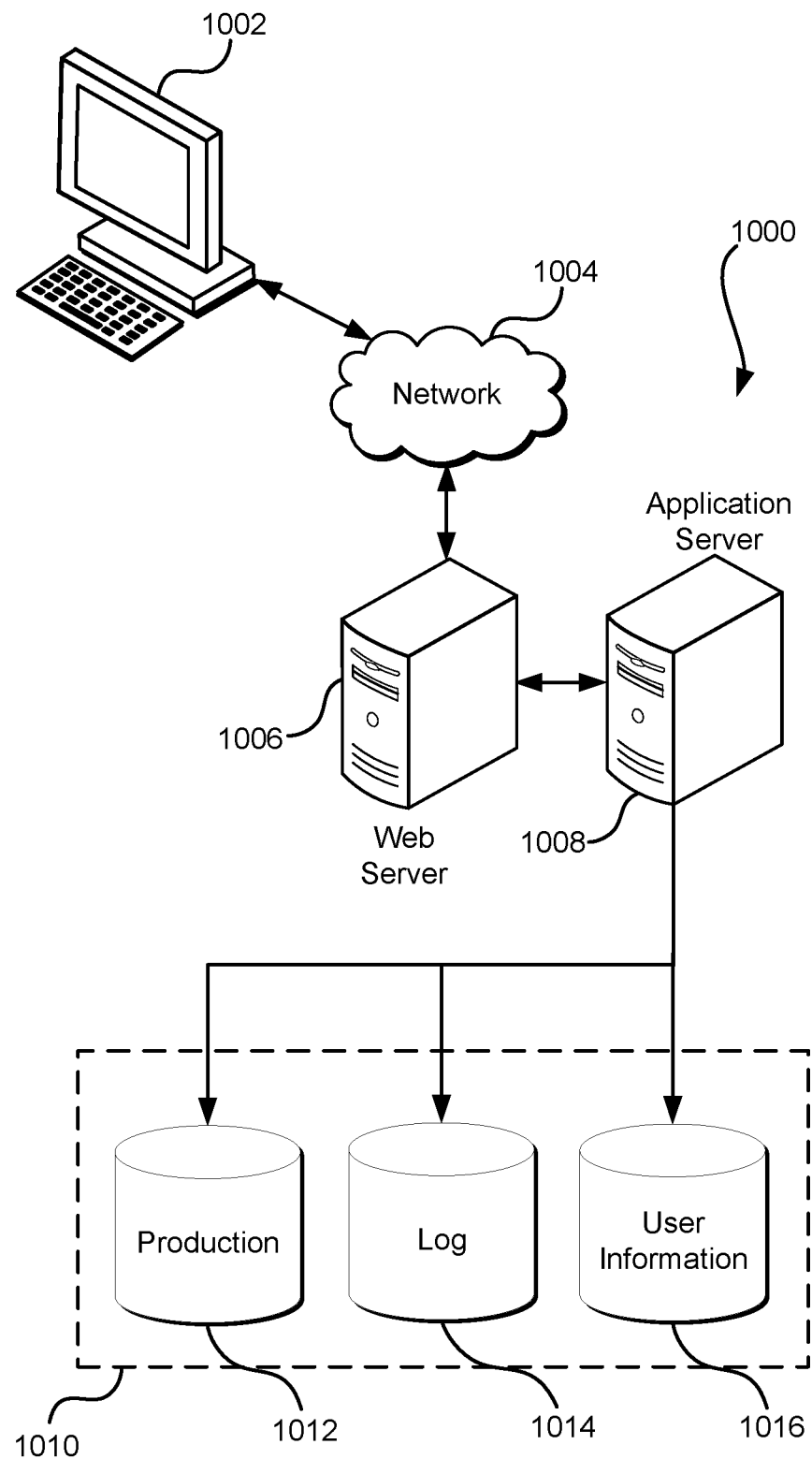
FIG. 10 illustrates an environment in which various embodiments can be implemented.

FIG. 10 illustrates aspects of an example environment 1000 for implementing aspects in accordance with various embodiments of the techniques for asynchronously indexing database tables described herein. As will be appreciated, although a web-based environment is used for purposes of explanation, different environments may be used, as appropriate, to implement various embodiments of the techniques for asynchronously indexing database tables described herein. The environment includes an electronic client device 1002, which can include any appropriate device operable to send and/or receive requests, messages, or information usable to asynchronously index database tables over an appropriate network 1004 and, in some embodiments, to convey information usable to asynchronously index database tables back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as the tasks associated with asynchronously indexing database tables described herein. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, database services, data storage devices, and data storage media, in any standard, distributed, virtual, or clustered environment.

The application server can include any appropriate hardware, software and firmware for integrating with the data store as needed to execute aspects of one or more applications for the client device, handling some or all of the data access and business logic for an application such as an application that asynchronously indexes database tables and/or an application that uses asynchronously indexed database tables. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CS S"), JavaScript Object Notation (JSON), and/or another appropriate client-side structured language.

Content transferred to a client device may be processed by the client device to provide the content in one or more forms including, but not limited to, forms that are perceptible to the user audibly, visually, and/or through other senses. The handling of all requests and responses, as well as the delivery of content between the client device 1002 and the application server 1008, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1010 can include several separate data tables, databases, database services, data documents, dynamic data storage schemes, and/or other data storage mechanisms and media for storing data relating to a particular aspect of the present disclosure. For example, the data store illustrated may include mechanisms for storing production data 1012 and user information 1016, which can be used to serve content for the production side. Such data may be asynchronously indexed using the techniques described herein. The data store also is shown to include a mechanism for storing log data 1014, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 1010.

The data store 1010 is operable, through logic associated therewith, to receive instructions from the application server 1008 and obtain, update, or otherwise process data in response thereto. The application server 1008 may provide static, dynamic, or a combination of static and dynamic data in response to the received instructions. The data provided by the application server 1008 may be stored in a database table that may be asynchronously indexed as described herein. Dynamic data, such as data used in web logs (blogs), shopping applications, news services, and other such applications may be generated by server-side structured languages as described herein or may be provided by a content management system ("CMS") operating on, or under the control of, the application server.

In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. The information may be returned to the user from data stored in a database table, from data stored in an index table, or using a combination of such data. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory, or other memory technology, Compact Disc Read-Only Memory ("CD-ROM"), digital versatile disk (DVD), or other optical storage, magnetic cassettes, magnetic tape, magnetic disk storage, or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset," unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood within the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method performed by a computer system with volatile and persistent memory, comprising:
    receiving one or more data to be stored in a database table;
    storing the one or more data in the database table;
    storing a copy of the one or more data in a replica database table;
    updating an index table to include one or more indexes to the one or more data, the index table comprising a sort key to provide a sortable view of data in the database table;
    storing a first copy of the one or more indexes in a first replica of the index table, the first replica of the index table stored in volatile memory and available to service one or more queries during an asynchronous process to update a second replica of the index table in persistent memory;

storing a second copy of the one or more indexes in a queue;

reading the second copy of the one or more indexes from the queue; and asynchronously with respect to the storing of the second copy in the queue, storing the second copy of the one or more indexes to the second replica of the index table in the persistent memory.

2. The computer-implemented method of claim 1, wherein the storing of the second copy of the one or more indexes to the second replica of the index table is performed by the asynchronous process of a database service.

3. The computer-implemented method of claim 1, wherein the first replica of the index table is stored in computer system memory.

4. The computer-implemented method of claim 1, wherein the second replica of the index table is stored in persistent storage.

5. A system, comprising:
one or more processors; and
memory to store computer-executable instructions that, if executed, cause the one or more processors to:
store, using an index table of a database, an update to one or more indexes to data of the database, the index table to provide a sortable view of at least a portion of data in the database;
store a first copy of the update in a first replica of the index table stored in volatile memory, the first replica of the index table available to service one or more queries by an independent process to update a second replica of the index table in persistent memory; and
provide the update to the independent process that stores a second copy of the update in the second replica of the index table stored in the persistent memory.

6. The system of claim 5, wherein the first replica of the index table is stored in volatile memory.

7. The system of claim 5, wherein the second replica of the index table is stored on a disk drive.

8. The system of claim 5, wherein the update provided to the independent process that stores the second copy of the update in the second replica of the index table is stored in a queue.

9. The system of claim 5, wherein the update provided to the independent process that stores the second copy of the update in the second replica of the index table is provided using an event message.

10. The system of claim 5, wherein the update provided to the independent process that stores the second copy of the update in the second replica of the index table is an update of a plurality of updates provided to the independent process, the plurality of updates provided to the independent process using a batch process.

11. The system of claim 5, wherein:
the first replica of the index table is a first replica of a plurality of first replicas of the index table;
the second replica of the index table is a second replica of a plurality of second replicas of the index table; and
each first replica of the index table of the plurality of first replicas of the index table has one corresponding second replica of the index table of the plurality of second replicas of the index table.

12. The system of claim 11, wherein:
the index table is a leader; and
the second replicas of the index table are followers.

13. A non-transitory computer-readable storage medium storing executable instructions that as a result of being executed by one or more processors of a computer system, cause the computer system to:
store, using an index table to provide a sortable view of data in a database table, an update to one or more indexes to the data of the database table;
store a first copy of the update in a first replica of the index table stored in volatile memory, the first replica of the index table available to service one or more queries during an asynchronous process to update a second replica of the index table in non-volatile memory; and
provide a second copy of the update for storage to the second replica of the index table stored in the non-volatile memory, the storage of the second copy of the update to the second replica of the index table stored in the non-volatile memory performed asynchronously of storing the first copy of the update in the first replica of the index table stored in volatile memory.

14. The non-transitory computer-readable storage medium of claim 13, wherein the executable instructions further include executable instructions that, when executed by the one or more processors, cause the computer system to provide the second copy of the update to the asynchronous process that stores the second copy of the update in the second replica of the index table.

15. The non-transitory computer-readable storage medium of claim 13, wherein the executable instructions further include executable instructions that, when executed by the one or more processors, cause the computer system to provide an acknowledgment of a receipt of second copy of the update for storage in the second replica of the index table to the index table of the database, the acknowledgment corresponding to the update to the one or more indexes.

16. The non-transitory computer-readable storage medium of claim 15, wherein the acknowledgment is an acknowledgment of a plurality of acknowledgments that are provided to the index table of the database in a batch.

17. The non-transitory computer-readable storage medium of claim 13, wherein the index table is generated from the database table.

18. The non-transitory computer-readable storage medium of claim 13, wherein the executable instructions further include executable instructions that, when executed by the one or more processors, cause the computer system to, after a period of time since the update to the one or more indexes has been stored, provide a third copy of the update for storage in the second replica of the index table.

19. The non-transitory computer-readable storage medium of claim 13, wherein index table is a global secondary index of the database table.

20. The system of claim 13, wherein the index table is a local secondary index of the database table.

* * * * *